United States Patent [19]
Lentini

[11] Patent Number: 6,079,585
[45] Date of Patent: Jun. 27, 2000

[54] TRUCK BOX WITH IMPROVED OPERATING ROD

[76] Inventor: Robert Lentini, 410 Rodney St., Pensacola, Fla. 32534

[21] Appl. No.: 09/152,633

[22] Filed: Sep. 14, 1998

[51] Int. Cl.[7] .............................. B60R 9/00; B65D 45/20
[52] U.S. Cl. ......................... 220/324; 220/210; 224/404; 292/46
[58] Field of Search ..................... 220/324, 243, 220/244, 249, 246, 314, 315, 325, 326, 810; 70/451, 466, 159, 162, 208; 292/46; 224/404

[56] References Cited

U.S. PATENT DOCUMENTS

| | | | |
|---|---|---|---|
| 1,829,601 | 10/1931 | Mears et al. | 292/46 |
| 4,273,368 | 6/1981 | Tanaka | 292/48 |
| 4,946,215 | 8/1990 | Taylor | 224/404 |
| 5,042,853 | 8/1991 | Gleason et al. | 292/126 |
| 5,601,206 | 2/1997 | Haas et al. | 220/324 |
| 5,875,948 | 3/1999 | Sadler | 292/46 |

*Primary Examiner*—Stephen Castellano
*Assistant Examiner*—Niki M. Eloshway
*Attorney, Agent, or Firm*—Holland & Knight LLP

[57] ABSTRACT

A truck box is disclosed comprising a front wall carrying a pair of spaced paddle latches and being formed with a channel extending at least between the paddle latches, a back wall, a bottom wall, opposed end walls and a top lid pivotally mounted to the back wall, all of which are interconnected to define a hollow interior. The operating rod has a first end section connected to one paddle latch, a second end section connected to the other paddle latch, and, an offset center section which is mounted by at least one rod guide within the channel formed in the front wall. The channel substantially encloses the center section of the operating rod to protect it from contact with items loaded into and unloaded from the box interior, and the rod guide(s) support the center section to prevent vibration or other contact with the front wall during operation of the vehicle within which the truck box is mounted.

13 Claims, 3 Drawing Sheets

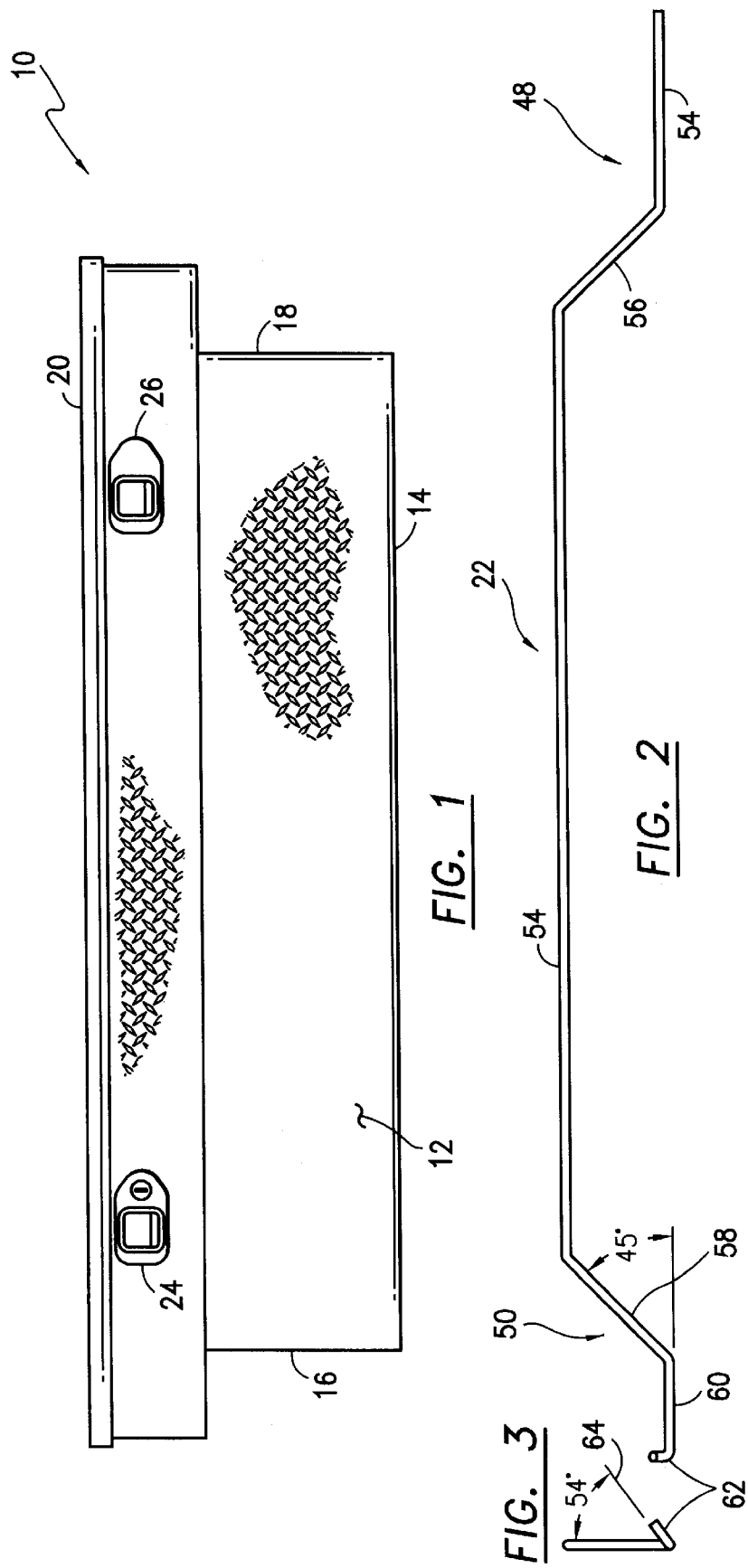

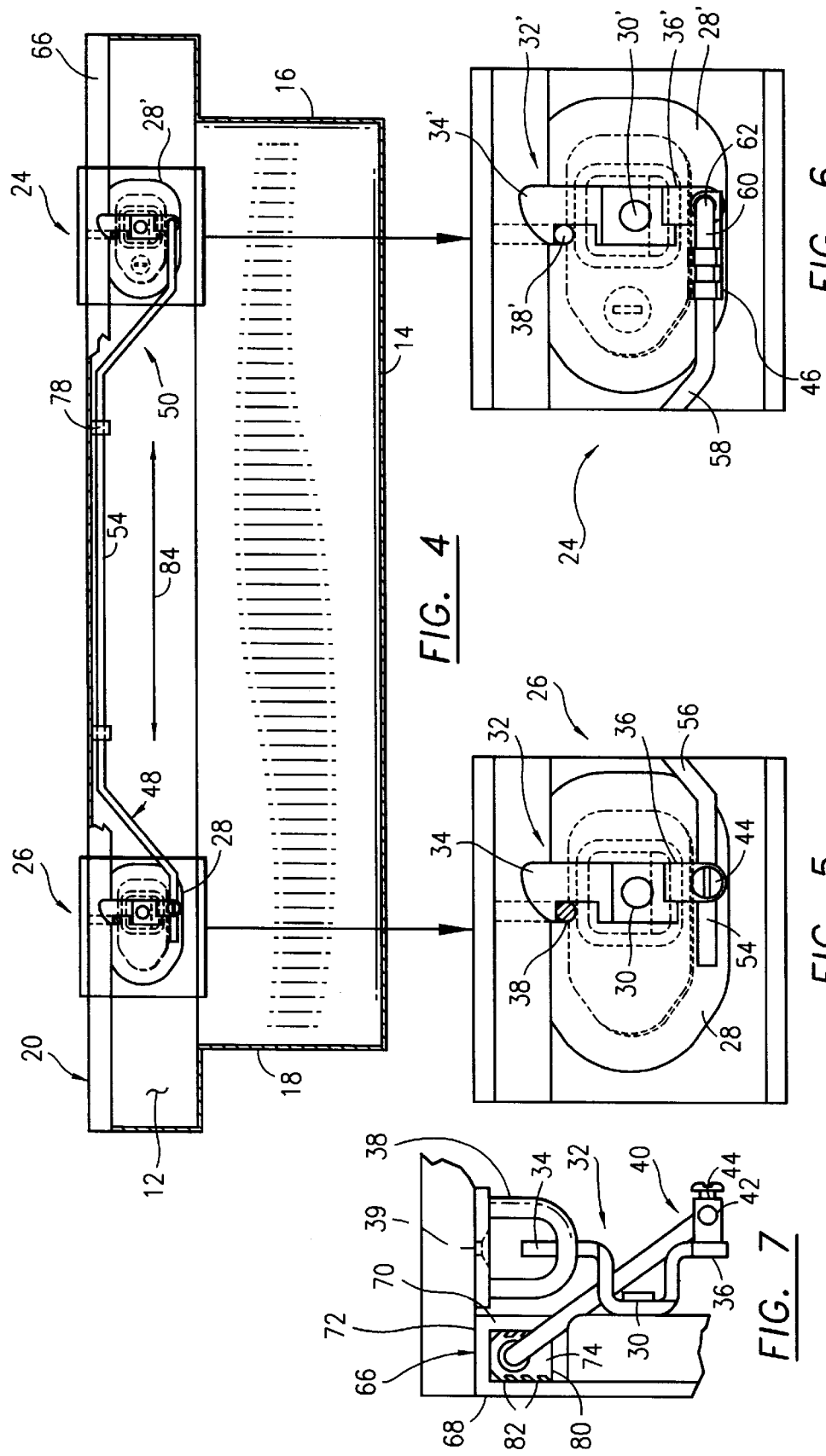

TRUCK BOX WITH IMPROVED OPERATING ROD

FIELD OF THE INVENTION

This invention relates to truck boxes, and, more particularly, to an improved operating rod for the paddle latches of the truck box which open and close the box lid.

BACKGROUND OF THE INVENTION

One of the most popular accessories for trucks and recreational vehicles is a truck box used to store and secure a variety of tools and other items. There are a number of different types of truck boxes, including cross-over boxes, sidemount boxes, chest boxes, topmount boxes, RV boxes and others. Each truck box is typically formed of aluminum treadplate, and comprises a front wall, a back wall, a bottom wall and opposed end walls which are interconnected by welding to form a hollow interior. The truck box interior is closed by a top wall or lid pivotal on a hinge between an open position and a closed position, usually with the assistance of gas springs.

In order to lock the lid and secure the contents of the truck box, most aluminum truck boxes include a pair of paddle latches mounted at opposite ends of the front wall in position to releasably engage a corresponding pair of striker bars carried by the lid. Each paddle latch has a latch element which is pivotal between a closed position in which it engages one of the striker bars of the lid, and an open position wherein the striker bar is released to permit the lid to be opened. The latch elements of the paddle latches must be moved to the open and closed positions simultaneously, and this is achieved in most truck box designs by an operating rod extending along the front wall within the interior of the box between the two paddle latches. The operating rod is connected at its opposite ends to respective paddle latches, so that side-to-side movement of the operating rod in one direction causes the latch elements of the paddle latches to pivot to the open position whereas movement of the operating rod in the opposite direction pivots the latch elements to the closed position.

There are a number of deficiencies with current designs of operating rods of the type described above. In most instances, the operating rod extends linearly between the paddle latches in an exposed location within the truck box interior along its front wall. This not only detracts visually from the overall appearance of the box, but in such exposed position the operating rod can be bent or disconnected from the paddle latches when tools or other items are loaded into or unloaded from the box interior. Additionally, the operating rod reduces the usable space within the interior of the truck box. Moreover, in most truck box designs, the operating rod is supported only at its ends where it is connected to the paddle latches. As a result, the center section of the operating rod can strike the front wall of the box as the vehicle to which the box is mounted is being driven, creating noise which is unacceptable to the vehicle operator.

SUMMARY OF THE INVENTION

It is therefore among the objectives of this invention to provide a truck box having an improved operating rod which is positioned to substantially avoid contact with items loaded into and unloaded from the box interior, which increases storage capacity within the truck box, and which is carried on the front wall of the box without making noise as the vehicle is operated.

These objectives are accomplished in a truck box comprising a front wall carrying a pair of spaced paddle latches and being formed with a channel extending at least between the paddle latches, a back wall, a bottom wall, opposed end walls and a top lid pivotally mounted to the back wall, all of which are interconnected to define a hollow interior. The operating rod has a first end section connected to one paddle latch, a second end section connected to the other paddle latch, and, an offset center section which is mounted by at least one rod guide within the channel formed in the front wall. The channel substantially encloses the center section of the operating rod to protect it from contact with items loaded into and unloaded from the box interior, and the rod guide(s) support the center section to prevent vibration or other contact with the front wall during operation of the vehicle within which the truck box is mounted.

One aspect of this invention is predicated upon the concept of constructing an operating rod which is substantially hidden from view and protected within the interior of the box, except at its ends which connect to the paddle latches. The center section is angularly offset from the opposed end sections of the operating rod and enclosed within the channel formed along the front wall of the box. The first end section of the operating rod has a linear portion, substantially parallel but offset from the center section, which is received within a mounting block associated with the latch element of one of the paddle latches and secured in place thereto by a set screw. The second end section of the operating rod is mounted by a spring clip to the latch element of the other paddle latch. In response to pivotal movement of one of the latch elements upon opening or closing of the top lid, the operating rod is moved in a side-to-side direction to simultaneously pivot the other latch element in the same direction.

In the presently preferred embodiment, the center section of the operating rod is mounted within the channel in the front wall of the box by one or more rod guides. Each rod guide has a central throughbore which slidably receives the operating rod, and a guide body which is press fit or otherwise secured within the channel in the front wall. These rod guides not only maintain the operating rod in position within the channel, but prevent contact between the operating rod and the front wall of the box during operation of the vehicle within which the box is mounted so as to reduce noise.

DESCRIPTION OF THE DRAWINGS

The structure, operation and advantages of the presently preferred embodiment of this invention will become further apparent upon consideration of the following description, taken in conjunction with the accompanying drawings, wherein:

FIG. 1 is a front view of one type of truck box with which the operating rod of this invention can be utilized;

FIG. 2 is a view of the operating rod herein;

FIG. 3 is an end view of FIG. 2;

FIG. 4 is a view in partial cross section of the interior of the truck box depicting the front wall with the operating rod connected at each end to a paddle latch;

FIG. 5 is an enlarged view of one of the paddle latches shown in FIG. 4;

FIG. 6 is an enlarged view of the other paddle latch illustrated in FIG. 4;

FIG. 7 is an end view of FIG. 5, depicting the paddle latch, operating rod and the rod guide which mounts the operating rod.

DETAILED DESCRIPTION OF THE INVENTION

Figure 8:
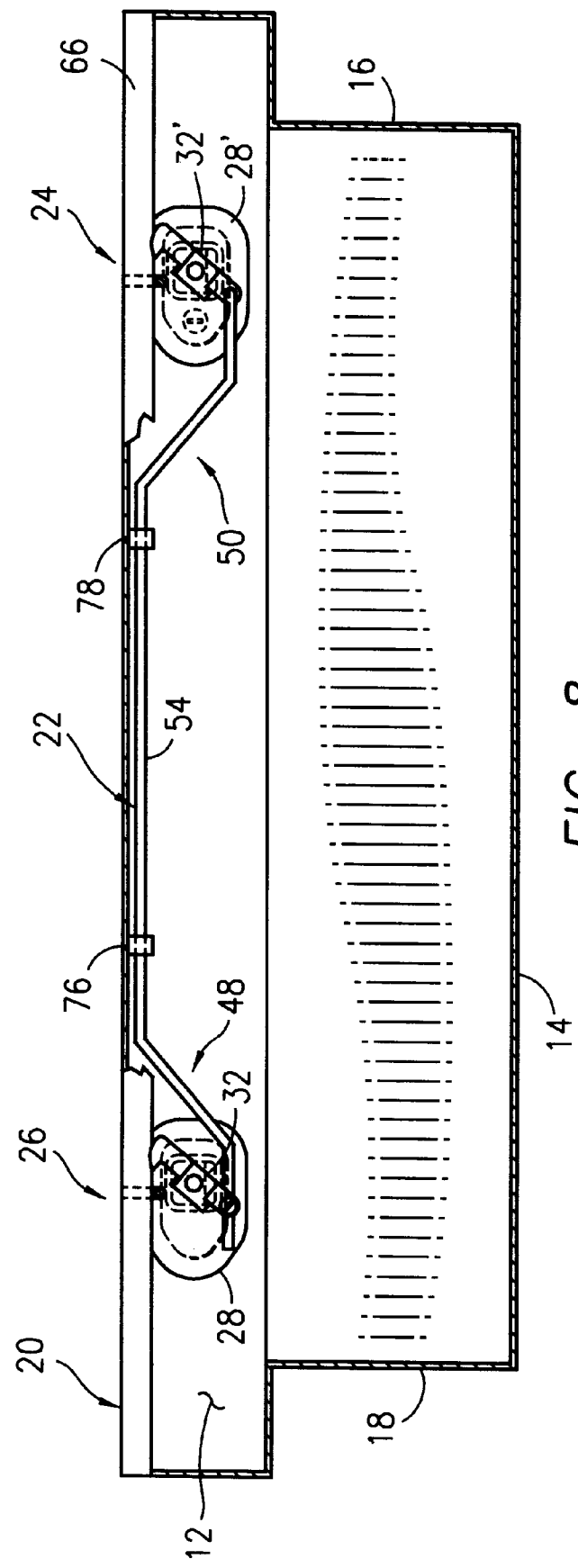
FIG. 8 is a view similar to FIG. 4 except with the paddle latches in the open position.

Referring now to the Figs., the truck box 10 of this invention comprises a front wall 12, bottom wall 14, opposed end walls 16, 18, a top wall or lid 20 and a back wall (not shown). Each of the walls 12–20 are preferably formed of aluminum tread plate, and are interconnected by welding to form a hollow interior. For purposes of illustration and the present discussion, a single lid, cross-over box is depicted in the Figs. with the operating rod 22 of this invention. It is contemplated that other types of truck boxes could be employed with operating rod 22, including side-mount boxes, chest boxes, topmount boxes, trailer boxes, RV boxes and the like.

A pair of paddle latches 24 and 26 are mounted to the front wall 12 and spaced from one another as best shown in FIGS. 1, 4 and 8. The paddle latches 24, 26 are commercially available units, and the detailed construction of same forms no part of this invention. For purposes of the present discussion, paddle latch 26 includes a latch body 28 carried by the front wall 12 which is mounted by a pivot pin 30 to a latch element 32 having an upper hook end 34 and a lower end 36. The upper hook end 34 of latch element 32 is releasably engageable with a striker 38 mounted by one or more screws 39 to the underside of the top lid 20. The lower end 36 of latch element 32 carries a mounting block 40 having a central bore 42 and a transversely oriented set screw 44, the purposes of which will be discussed in detail below.

The paddle latch 24 is similar to paddle latch 26, and same references numbers are used to described the common elements thereof with the addition of a "'" in the structure of paddle latch 24. The primary difference between paddle latches 24, 26 is the manner in which the operating rod 22 is attached thereto as described below. As best seen in FIG. 6, the lower end 36' of paddle latch 24 is formed with a bore to receive one end of the operating rod 22 which is held in place by a spring clip 46. Additionally, the hook end 34' of latch element 32' associated with paddle latch 24 is positioned to receive the striker 38' mounted to the underside of top lid 20.

With reference to FIGS. 2 and 3, the structured details of operating rod 22 are depicted. Preferably, the operating rod is formed of one quarter inch diameter 1020 cold rolled steel rod, coated with clear zinc to enhance corrosion resistance. Smaller diameter rods may also be utilized depending upon latch force requirements. The operating rod 22 comprises a first end section 48, a second end section 50 and an offset, center section 52 extending therebetween. The first end section 48 includes a linear portion 54, oriented substantially parallel to the center section 52 and connected to the center section 52 by an angled portion 56. In the presently preferred embodiment the angled portion 56 of first end section 48 extends at approximately a 45° angle between the linear portion 54 and center section 52. The second end section 50 comprises an angled portion 58 connected at one end to the center section 52 and at the opposite end to an intermediate portion 60. The intermediate portion 60, in turn, is connected to an extension 62. The angled portion 58 of second end section 50 is oriented at an angle of approximately 45° with respect to the intermediate portion 60 as shown in FIG. 2.

The linear portion 54 and angled portion 56 of first end section 48, the center section 52, and, the angled portion 58 and intermediate portion 60 of second end section 50, are all contained within a common plane with the intermediate portion 60, linear portion 54 and center section 52 all being substantially parallel to one another. As shown in FIGS. 2 and 3, the extension 62 of second end section 50 is angularly offset from the remainder of the operating rod 22. Such extension 62 has a longitudinal axis 64 which is preferably oriented at an angle of about 54° with respect to the angled portion 58 of second end section 50, and, hence, relative to the plane which contains the remaining elements of operating rod 22, as noted above.

With reference now to FIGS. 4–8, the manner in which the operating rod 22 is mounted to the truck box 10 is shown in detail. In the presently preferred embodiment, the linear portion 54 of first end section 48 extends through the central bore 42 of the mounting block 40 carried by the latch element 32 of paddle latch 26. The linear portion 54 is held in place by tightening down the set screw 44 within the central bore 42. The second end section 50 of operating rod 22 is mounted to the latch element 32' of paddle latch 24 by the spring clip 46. As best seen in FIG. 6, the extension 62 of second end section 50 is received within the bore formed in the lower end 36' of paddle latch 24. Once in position, the spring clip 46 retains the extension 62 within the lower end 36' of latch element 32' in preparation for opening and closing of the lid 20 as described below.

An important aspect of this invention involves the configuration of operating rod 22, and the manner in which it is carried by the front wall 12 of truck box 10. In the presently preferred embodiment, the front wall 12 is formed with a roll-over channel 66 having a generally inverted U-shape defined by an outer side wall 68, inner side wall 70, a top wall 72 and an open bottom 74. See FIG. 7. The term "outer" refers to the outside of the truck box 10, whereas "inner" refers to the truck box interior. The angled portions 56, 58 of first and second end sections 48, 50, respectively, extend from the paddle latches 24 and 26 so that the center section 52 of operating rod 22 is located within the roll-over channel 66 formed in the front wall 12 of truck box 10. In this position, the center section 52, and, hence, the majority of the operating rod 22, is hidden from view and protected from contact with items which are loaded into or unloaded from the interior of the truck box 10. This provides a significant advantage over other designs in which the operating rod extends linearly between the paddle latches 24, 26 thus exposing such operating rods to damage by contact with items placed in the truck box, necessitating use of a rod guard that uses up valuable storage space and creates a visually unacceptable appearance.

In the presently preferred embodiment, the center section 52 of operating rod 22 is retained in place within the roll-over channel 66 by a pair of rod guides 76 and 78. One embodiment of the rod guides 76, 78 suitable for use in this invention is depicted in FIG. 7, although it is contemplated that a variety of other rod guides could be employed. For purposes of the present discussion, each rod guide 76 and 78 comprises a body 80 having opposed sides each formed with space recesses defining outwardly extending fins 82. Each rod guide 76 and 78 is inserted into the roll-over channel 66 through the open bottom 74 such that the fins 82 on opposite sides of the rod guide body 80 engage the outer side wall 68 and inner side wall 70 of the channel 66. The angulation of fins 82 tends to prevent dislodgement of the rod guides 76 and 78 from the channel 66. The center section 52 of the operating rod 22 is received within a throughbore formed in each rod guide 76 and 78, which is larger in diameter than the center section 52 so as to permit relative movement therebetween.

The paddle latches 24 and 26, and operating rod 22, function as follows. In the closed position of top lid 20, shown in FIGS. 4–7, the upper hook ends 34, 34' of latch elements 32, 32' engage respective strikers 38, 38'. When one of the paddle latches 24 or 26 is operated, an internal spring (not shown) causes the respective latch element 32 or 32' to pivot from the closed or locked position shown in FIG. 4 to the open or unlocked position shown in FIG. 8. Pivotal motion of one of the latch elements 32 or 32' causes the operating rod 22 to move to the right as shown by the arrow 84 in FIGS. 4 and 8, thus pivoting the other latch element 32 and 32' to an unlocked position. Once the strikers 38 and 38' are disengaged by the latch elements 32, 32', the top lid 20 of truck box 10 can be opened. When it is desired to close and secure the top lid 20, the operating rod 22 is moved to the left in the position depicted in FIG. 4.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A truck box, comprising:
    a front wall, back wall, bottom wall, opposed end walls and a top lid all interconnected to form a hollow interior, said top lid mounting a pair of spaced strikers;
    a pair of paddle latches carried by said front wall and being spaced from one another, each of said paddle latches having a latch element with a hook end positioned to releasably engage one of said strikers;
    said front wall being formed with a channel which spans at least said space between said paddle latches, said channel having an interior within which at least one rod guide is received and mounted;
    an operating rod having a first end section, a second end section and a center section therebetween, said center section being slidably received within said at least one rod guide and extending within said interior of said channel between said paddle latches to substantially protect said center section from exposure to said hollow interior, said first end section being mounted to one of said latch elements and said second end section being mounted to the other of said latch elements, said operating rod being movable between an open position in which said hook end of each said latch elements disengages a respective striker bar and a closed position in which said hook end of each said latch elements engage a respective striker bar.

2. The truck box of claim 1 in which said first end section of said operating rod includes a linear portion oriented substantially parallel to said center section, and an angled portion extending between said center section and said linear portion, said linear portion being connected to one of said paddle latches.

3. The truck box of claim 2 in which one of said latch elements carries a mounting block formed with a bore which receives said linear portion of said first end section of said operating rod, said linear portion being engaged by a set screw to retain it in place in said mounting block.

4. The truck box of claim 1 in which said second end section of said operating rod includes angled portion connected to said center section, an extension, and an intermediate portion connected between said extension and said angled portion, said intermediate portion being oriented substantially parallel to said center section, said extension being connected to one of said latch elements and being oriented generally perpendicular to said angled portion and said intermediate portion.

5. The truck box of claim 4 in which said extension of second end section of said operating rod has a longitudinal axis, said first end section, said center section, and said angled portion and said intermediate portion of said second end section of said operating rod, all being oriented in a common plane, said longitudinal axis of said extension being oriented at an angle relative to said common plane.

6. The truck box of claim 5 in which said angle is about 54°.

7. The truck box of claim 1 in which said at least one rod guide includes a guide body formed with a series of slots on opposed sides thereof, said slots defining spaced fins therebetween which are effective to engage said channel.

8. The truck box of claim 7 in which said channel in said front wall has opposed side walls and an open bottom facing said bottom wall, said rod guides being inserted into said channel through said open bottom in position so that said opposed sides of said guide body each engage one of said side walls of said channel, said fins formed in each of said sides of said guide body being angled to engage and resist motion relative to said channel side walls in a direction toward said bottom wall.

9. A truck box, comprising:
    a front wall, back wall, bottom wall, opposed end walls and a top lid all interconnected to form a hollow interior, said top lid mounting a pair of spaced strikers;
    a pair of paddle latches carried by said front wall and being spaced from one another, each of said paddle latches having a latch element with a hook end positioned to releasably engage one of said strikers;
    said front wall being formed with a channel having opposed side walls and an open bottom facing said bottom wall defining a channel interior, said channel spanning at least said space between said paddle latches;
    at least one rod guide insertable through said open bottom of said channel and in engagement with said opposed side walls of said channel, said at least one rod guide being formed with a throughbore;
    an operating rod including:
        (i) a center section insertable within said throughbore of said at least one rod guide, said center section extending within said channel interior between said paddle latches to substantially protect said center section from exposure to said hollow interior;
        (ii) a first end section having a linear portion, and an angled portion connected between said linear portion and said center section, said linear portion being mounted to one of said latch elements;
        (iii) a second end section having an angled portion connected to said center section, an extension, and, an intermediate portion connected between said extension and said angled portion, said extension being connected to the other of said latch elements, said operating rod being movable between an open position in which said hook end of each said latch elements disengage a respective striker bar and a closed position in which said hook end of each said latch elements engages a respective striker bar.

10. The truck box of claim 9 in which said one latch element carries a mounting block formed with a throughbore, said linear portion of said first end of said operating rod being insertable within said throughbore and retained in said mounting block with a set screw.

11. The truck box of claim 9 in which said angled portion of said second end of section is oriented at an angle of about 45° with respect to said intermediate portion thereof.

12. The truck box of claim 9 in which said extension of second end section of said operating rod has a longitudinal axis, said first section, said center section, and said angled portion and said intermediate portion of said second end section of said operating rod, all being oriented in a common plane, said longitudinal axis of said extension being oriented at an angle relative to said common plane.

13. The truck of claim 12 in which said angle is about 54°.

* * * * *